United States Patent [19]

Ohchi

[11] Patent Number: 4,744,598
[45] Date of Patent: May 17, 1988

[54] SEAT STRUCTURE FOR VEHICLE

[75] Inventor: Masato Ohchi, Toyota, Japan

[73] Assignee: Toyota Jidosha Kabushiki Kaisha, Toyota, Japan

[21] Appl. No.: 916,164

[22] Filed: Oct. 7, 1986

[30] Foreign Application Priority Data

Nov. 1, 1985 [JP] Japan .................. 60-168951

[51] Int. Cl.⁴ .................................................. A47C 31/00
[52] U.S. Cl. ..................... 297/183; 297/468; 297/361; 297/481
[58] Field of Search ............ 297/183, 468, 481, 483, 297/361, 362

[56] References Cited

U.S. PATENT DOCUMENTS

| | | | |
|---|---|---|---|
| 3,230,009 | 1/1966 | Schmidt et al. | 297/481 |
| 3,333,891 | 8/1967 | Werner et al. | 297/362 |
| 3,401,979 | 9/1968 | Putsch | 297/362 |
| 4,054,966 | 10/1977 | Putsch et al. | 297/362 |
| 4,304,438 | 12/1981 | Nardi | 297/362 |
| 4,326,748 | 4/1982 | Brusasco | 297/362 |
| 4,405,155 | 9/1983 | Matsuoka | 297/483 |
| 4,470,633 | 9/1984 | Fourrey et al. | 297/362 |
| 4,629,251 | 12/1986 | Tezuka | 297/362 |

Primary Examiner—Francis K. Zugel
Attorney, Agent, or Firm—Cushman, Darby & Cushman

[57] ABSTRACT

A seat structure for a vehicle which is provided with a seat adjusting mechanism includes a dial-type handle projecting from a position on a seat which is in the vicinity of an occupant restraining webbing. The seat adjusting mechanism is actuated to effect adjustment of the seat by turning the handle. A recess is formed in the side of the handle which is closer to the surface of the seat, the recess extending in the circumferential direction of the handle. A cover member is disposed on the seat in opposing relation to the size of the handle which is closer to the surface of the seat, the cover member concealing a mechanism portion of the seat adjusting mechanism. In addition, a projecting wall is provided on the cover member so as to extend into the recess. Accordingly, the webbing is prevented from deeply entering the gap defined between the handle and cover member.

14 Claims, 3 Drawing Sheets

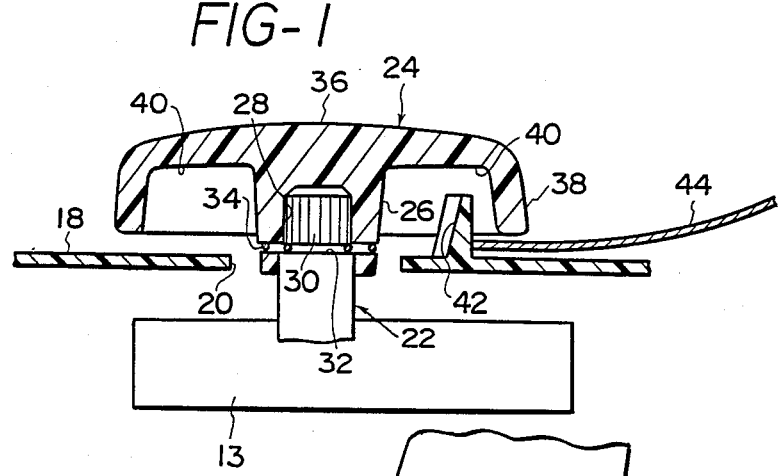
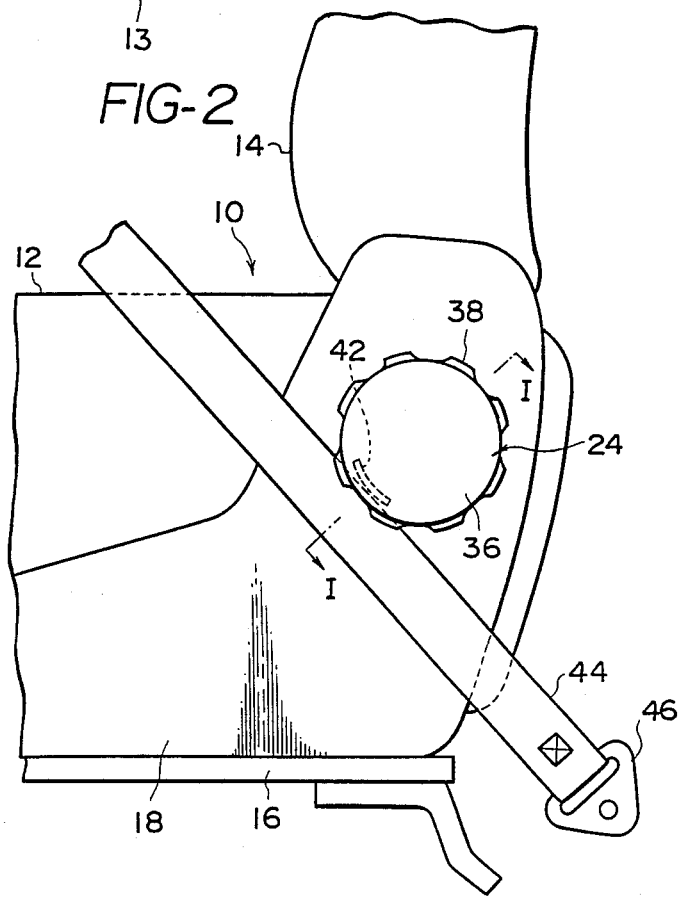

SEAT STRUCTURE FOR VEHICLE

BACKGROUND OF THE INVENTION

1. Field of the Invention

The present invention relates to a seat structure for a vehicle which is provided with a seat adjusting mechanism such as a seat back reclining adjuster or a seat cushion vertical adjuster.

2. Description of the Related Art

Many seats for vehicles, particularly front seats of automobiles, are provided with seat adjusting mechanisms such as a seat back reclining adjuster, a seat cushion vertical adjuster, etc. These adjusting mechanisms are generally actuated with lever- or dial-type handles which project from the seats. In many cases, dial-type handles are adopted for mechanisms which enable stepless adjustment.

In the case of a seat adjusting mechanism which is actuated with a dial-type handle, if this handle is disposed at a position at which it may interfere with an occupant restraining webbing of a seatbelt system, there is a fear of the webbing deeply entering the gap defined between the handle and a cover member provided to conceal a mechanism portion of the adjusting mechanism.

To solve such problem, the prior art disclosed in the specification of Japanese Utility Model Laid-Open No. 141847/1984 proposes a reclining system for a vehicle such as that shown in FIG. 4. In this system, a cover member 50 which conceals a mechanism portion has a projecting wall 54 which projects in such a manner as to surround the peripheral side surface of a handle 52.

This conventional system, however, has the disadvantage that the range within which the handle 52 can be gripped is reduced to A shown in FIG. 4, which deteriorates the operability of the handle 52. In order to overcome this disadvantage, if the thickness of the handle 52 is increased as shown by the one-dot chain line in FIG. 4 so as to enlarge said range to B, it becomes impossible, in many cases, to ensure a satisfactory clearance between the handle 52 and a structural member of the vehicle which is located on the outer side of the seat.

SUMMARY OF THE INVENTION

In view of the above-described circumstances, it is a primary object of the present invention to provide a seat structure for a vehicle which is provided with a seat adjusting mechanism, the seat structure being so designed that there is no fear of an occupant restraining webbing deeply entering the gap defined between a dial-type handle and a cover member, and it is possible to improve the operability of the dial-type handle without any increase in the thickness thereof.

To this end, the present invention provides a seat structure for a vehicle, comprising: a seat for an occupant of the vehicle; a dial-type handle projecting from a position on the seat which is in the vicinity of an occupant restraining webbing, the handle being turned to actuate a seat adjusting mechanism incorporated in the seat so as to effect adjustment of the seat; a recess formed in the side of the handle which is closer to the surface of the seat, the recess extending in the circumferential direction of the handle; a cover member disposed on the seat in opposing relation to the side of the handle which is closer to the surface of the seat, the cover member concealing the seat adjusting mechanism; and a projecting wall provided on the cover member so as to extend into the recess.

By virtue of the above-described arrangement, the webbing is blocked by the projecting wall and thereby prevented from deeply entering the gap defined between the handle and the cover member.

In addition, the projecting wall is positioned in such a manner that it is concealed by the handle, and therefore the existence of the wall does not narrow the range within which the peripheral side surface of the handle can be gripped, which means that it is possible to improve the operability of the handle without any increase in the thickness thereof.

BRIEF DESCRIPTION OF THE DRAWINGS

FIGS. 1 and 2 show in combination one embodiment of a seat structure for a vehicle, which is provided with a seat adjusting mechanism, according to the present invention, in which the present invention is applied to a front left-hand side seat of an automobile, of which:

FIG. 1 is a fragmentary sectional view taken along the line I—I in FIG. 2; and

FIG. 2 is a side view of an essential part of the seat.

DESCRIPTION OF THE PREFERRED EMBODIMENT

Figure 3:
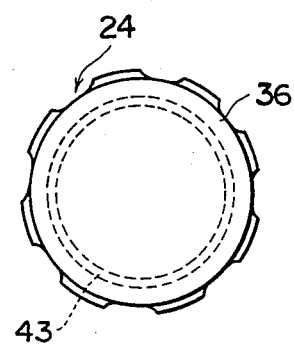
FIG. 3 is a front view of another example of the dial-type handle in accordance with the embodiment shown in FIGS. 1 and 2.
Figure 4:
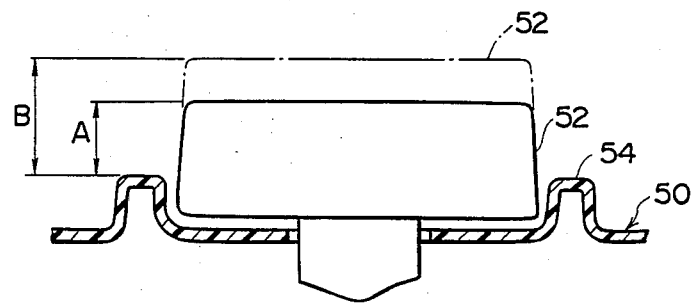
FIG. 4 is a fragmentary sectional view of a prior art, which corresponds to FIG. 1.

FIGS. 1 and 2 show in combination one embodiment of the seat structure for a vehicle, which is provided with a seat adjusting mechanism, according to the present invention. In this embodiment, the present invention is applied to a front left-hand side seat of an automobile.

Referring to FIG. 2, a seat 10 has a seat cushion 12 and a seat back 14 which are separate members from each other. The seat 10 is mounted on the floor of the vehicle through a seat track 16 which is disposed on the reverse side of the seat cushion 12 so that the position of the seat 10 is adjustable in the longitudinal direction of the vehicle. The seat cushion 12 and the seat back 14 are connected together through a hinge (not shown) in such a manner that the angle of the seat back 14 is adjustable by means of a reclining system having a seat adjusting mechanism 13 and a brake mechanism (not shown).

The mechanism portion of the reclining system is located at a position inside the seat cushion 12 which is close to the left-hand side surface thereof (the outer-side surface thereof in the lateral direction of the vehicle), but the mechanism portion is concealed by a seat side garnish 18, which serves as a cover member, disposed on the left-hand side surface of the seat cushion 12, thereby making the seat 10 look better.

As shown in FIG. 1, a through-hole 20 is formed in the seat side garnish 18, and a shaft 22 linked to the adjusting mechanism and a dial-type handle 24 are connected together through the through-hole 20 in such a manner that the handle 24 projects from the side surace of the seat cushion 12.

The dial-type handle 24 has a boss portion 26 provided with a serrated bore 28 which receives a serrated shaft 30 formed at the distal end of the shaft 22, so that the handle 24 is rotatable back and forth together with the shaft 22. The shaft 22 has a groove 32 formed in the root portion of the serrated shaft 30, the groove 32 extending along the circumferential direction of the shaft 22, and a snap ring 34 is fitted in the groove 32 to prevent the handle 24 from comping off the shaft 22. The handle 24 includes a disk portion 36 having a grip portion 38 formed along the entire circumference of the peripheral edge thereof in such a manner that the grip portion 38 extends toward the seat side garnish 18.

The seat side garnish 18 has a projecting wall 42 which extends into a recess 40 defined between the grip portion 38 and the boss portion 26 of the handle 24. The wall 42 has a circular cross-section as will be clear from FIG. 2, and is located in the vicinity of the intermediate portion of an occupant restraining webbing 44 of a seatbelt system when it is fastened to the body of an occupant seated in the seat 10.

One end portion of the occupant restraining webbing 44 is retained at the lower portion of a side wall member of the vehicle body through an anchor plate 46, while the intermediate portion of the webbing 44 is supported so as to make a U-turn by a slip joint (not shown) disposed at the upper portion of the side wall member, and the other end portion of the webbing 44 is wound up by means of biasing force into a webbing retractor (not shown) disposed on the side wall member at a position intermediate between the anchor plate 46 and the slip joint. In addition, a tongue plate (not shown) is supported by the intermediate portion of the webbing 44 which extends between the anchor plate 46 and the slip joint in such a manner that the tongue plate is slidable in the longitudinal direction of the webbing 44. The tongue plate is engageable with a buckle device (not shown) which stands from the floor of the vehicle body at a position adjacent to the right-hand side surface of the seat cushion 12 (the inner-side surface thereof in the lateral direction of the vehicle body).

The following is a description of the operation of this embodiment.

The seat 10 can be adjusted in accordance with the body size of each individual occupant. More specifically, the position of seat 10 in the longitudinal direction of the vehicle can be adjusted by moving the seat cushion 12 along the seat track 16, and the angle of inclination of the seat back 14 can be adjusted by virtue of the reclining system. The adjustment of the inclination angle of the seat back 14 is effected through the operation of the adjusting mechanism which is actuated by turning the dial-type handle 24. The handle 24 is turned by the occupant with the grip portion 38. Since no obstruction is disposed around the grip portion 38, the whole area of the grip portion 38 in the heightwise direction thereof is allowed to be used effectively. Accordingly, it is possible to obtain excellent operability without any increase in the thickness of the handle 24. In addition, there is no fear of the projecting wall 42 interfering with the turning of the handle 24, because the wall 42 is located within the recess 40 defined inside the handle 24.

When the occupant fastens the webbing 44 after adjusting the seat 10, the webbing 44 is disposed in a position where a portion of the webbing 44 interferes with the handle 24, and said portion enters the gap defined between the reverse side of the handle 24 and the garnish 18. However, the projecting wall 42 is positioned on the reverse side of the handle 24. Therefore, the webbing 44 is blocked by the wall 42 and thereby prevented from further advancing toward the center of the handle 24. Accordingly, it is possible to overcome problems which have heretofore been experienced with the prior art. For example, when the webbing 44 is unfastened from the occupant's body, there is no fear of the webbing 44 being caught by the handle 24, and the webbing 44 is therefore brought into an inoperative position smoothly and reliably.

Since in this embodiment the recess 40 is formed in the reverse side of the dial-type handle 24 and the projecting wall 42 is formed on the seat side garnish 18 so as to extend into the recess 40, there is no risk of the webbing 44 deeply entering the gap between the handle 24 and the garnish 18, and the operability of the handle 24 is therefore improved without any increase in the thickness thereof, which means that it is possible to avoid the sacrifice of the usable space in the compartment in the lateral direction of the vehicle.

In addition, since the projecting wall 42 is concealed by the handle 24, the design of the periphery of the handle 24 is simplified, and the seat 10 is thereby made look better. In addition, the usable compartment space in the diametrical direction of the handle 24 is also enlarged, and this increases the degree of freedom with which the compartment is designed.

Many conventional dial-type handles have recesses formed in the reverse sides thereof, respectively, for the purpose of reducing the material cost and the weight thereof. Therefore, if such known handles are employed, it is unnecessary to newly provide equipment for producing dial-type handles, and the present invention can be carried out at reduced cost.

Although in the above-described embodiment the projecting wall 42 has a circular cross-section, such wall is not necessarily limitative, and projecting walls of various kinds of configuration may be employed, provided that a projecting wall employed has a configuration with which the wall can block the entrance of the occupant restraining webbing and yet does not interfere with the turning of the handle, e.g., an annular projecting wall 43 such as that shown in FIG. 3. It is also possible to employ a structure wherein a projecting wall is produced as a member which is separate from the seat side garnish, and is rigidly secured to the garnish afterward.

Although in the above-described embodiment the present invention is applied to the dial-type handle part of a reclining system, the present invention may also be applied to the dial-type handle part of a seat cushion vertical adjuster which effects adjustment of the position of the seat cushion in the vertical direction.

As has been described above, the present invention provides a seat structure for a vehicle, comprising: a seat for an occupant of the vehicle; a dial-type handle projecting from a position on the seat which is in the vicinity of an occupant restraining webbing, the handle being turned to actuate a seat adjusting mechanism incorporated in the seat so as to effect adjustment of the seat; a recess formed in the side of the handle which is closer to the surface of the seat, the recess extending in the circumferential direction of the handle; a cover member disposed on the seat in opposing relation to the side of the handle which is closer to the surface of the seat, the cover member concealing the seat adjusting mechanism; and a projecting wall provided on the cover member so as to extend into the recess. There is therefore no fear of the webbing deeply entering the gap between the handle and the cover member, and it is possible to improve the operability of the handle without any increase in the thickness thereof, advantageously.

What is claimed is:

1. A seat structure for a vehicle, comprising:

a seat for an occupant of the vehicle;

a dial-type handle having a grip portion formed along an entire circumference of a peripheral edge thereof in such a manner that said grip portion extends toward a cover member, and projecting from a position on said seat which is in the vicinity of an occupant restraining webbing, said handle being turned to actuate a seat adjusting mechanism, concealed by said cover member and incorporated in said seat, so as to effect adjustment of said seat;

a recess formed inside of said handle in opposition to said cover member, said recess extending in the circumferential direction of said handle;

said cover member having a through-hole through which a shaft linked to said seat adjusting mechanism extends so as to be rigidly secured to said handle; and a projecting wall integral with said cover member having a height higher than the gap between said cover member and the peripheral edge portion of said handle, and extending into said recess in said handle, whereby the webbing is prevented from entering said gap more than a predetermined amount.

2. A seat structure for a vehicle according to claim 1, wherein said projecting wall is arc-shaped.

3. A seat structure for a vehicle according to claim 1, wherein said projecting wall is an annular wall.

4. A seat structure for a vehicle according to claim 1, wherein said handle has a boss portion formed in the center thereof surrounded by the recess, said boss portion having a serrated bore for receiving a serrated shaft formed at the distal end of said shaft.

5. A seat structure for a vehicle according to claim 4, wherein said serrated shaft has a circumferential groove formed in the root portion thereof, said groove accommodating a snap ring to prevent said handle from coming off said shaft.

6. A seat structure for a vehicle provided with a seat adjusting mechanism which is actuated to effect adjustment of a seat by turning a dial-type handle having a grip portion formed along an entire circumference of a peripheral edge thereof in such a manner that said grip portion extends toward a cover member which conceals said mechanism, and porjecting from a position on said seat in the vicinity of an occupant restraining webbing, comprising:

an annular recess formed inside of said handle in opposition to said cover member, said recess extending along the circumferential direction of said handle;

said cover member having a through-hole through which a shaft linked to said seat adjusting mechanism extends so as to be rigidly secured to said handle; and a projecting wall integral with said cover member having a height higher than a gap between said cover member and the peripheral edge portion of said handle, and extending into said recess in said handle, whereby the webbing is prevented from entering said gap more than a predetermined amount.

7. A seat structure for a vehicle according to claim 6, wherein said projecting wall is arc-shaped.

8. A seat structure for a vehicle according to claim 6, wherein said projecting wall is an annular wall.

9. A seat structure for a vehicle according to claim 6, wherein said handle has a boss portion formed in the center thereof surrounded by the recess, said boss portion having a serrated bore for receiving a serrated shaft formed at the distal end of said shaft.

10. A seat structure for a vehicle according to claim 9, wherein said serrated shaft has a circumferential groove formed in the root portion thereof, said groove accommodating a snap ring to prevent said handle from coming off said shaft.

11. A seat structure for a vehicle, comprising:

a seat for an occupant of the vehicle;

a dial-type handle having a grip portion formed along an entire circumference of a peripheral edge thereof in such a manner that said grip portion extends toward a side garnish, and projecting from a position on said seat at which said handle interferes with an occupant restraining webbing, said handle being turned to actuate a seat adjusting mechanism, concealed by said garnish; accommodated in said seat so as to effect adjustment of said seat;

an annular recess formed in said handle in opposition to said garnish, said recess extending along the circumferential direction of said handle;

said seat side garnish having a through-hole through which a shaft linked to said seat adjusting mechanism extends so as to be rigidly secured to said handle; and a projecting wall integral with said garnish having a height higher than a gap between said garnish and the peripheral edge portion of said handle, and extending into said recess in said handle, whereby said webbing is prevented from entering said gap more than a predetermined amount.

12. A seat structure for a vehicle according to claim 11, wherein said projecting wall is arc-shaped.

13. A seat structure for a vehicle according to claim 11, wherein said projecting wall is an annular wall.

14. A seat structure for a vehicle according to claim 11, wherein said handle has a boss portion formed in the center thereof surrounded by the recess, said boss portion having a serrated bore for receiving a serrated shaft formed at the distal end of said shaft.

* * * * *